United States Patent
Agnew

(10) Patent No.: US 6,454,494 B1
(45) Date of Patent: Sep. 24, 2002

(54) DEVICE FOR ANCHORING A PIPELINE

(76) Inventor: Patrick Agnew, 300 6025 11th Street SE, Calgary, Alberta T2H 2Z2 (CA)

(*) Notice: Subject to any disclaimer, the term of this patent is extended or adjusted under 35 U.S.C. 154(b) by 0 days.

(21) Appl. No.: 09/814,735

(22) Filed: Mar. 23, 2001

(51) Int. Cl.[7] .................................................. E02F 5/10
(52) U.S. Cl. ................................ 405/184.4; 405/154.1; 405/172
(58) Field of Search ........................ 405/154.1, 157, 405/172, 184.4, 244, 259.1; 248/49, 505, 507, 508; 138/105, 106, 107; 52/157, 162

(56) References Cited

U.S. PATENT DOCUMENTS

| | | | | |
|---|---|---|---|---|
| 2,864,633 A | * | 12/1958 | Mackie | 52/157 X |
| 3,036,542 A | * | 5/1962 | Robinson | 114/295 |
| 3,295,274 A | * | 1/1967 | Fulton | 52/157 X |
| 3,427,812 A | * | 2/1969 | Hollander | 405/172 |
| 3,494,849 A | * | 2/1970 | Hess | 248/49 X |
| 3,797,260 A | * | 3/1974 | Webb | 405/172 |
| 3,810,364 A | * | 5/1974 | Johnson | 405/184.4 |
| 4,826,111 A | * | 5/1989 | Ismert | 248/49 |
| 5,322,386 A | * | 6/1994 | Trangsrud | 52/162 X |
| 5,730,552 A | * | 3/1998 | Johannesson et al. | 405/172 |
| 6,106,199 A | * | 8/2000 | Medeiros, Jr. et al. | 405/224 |
| 6,132,141 A | * | 10/2000 | Kirk | 405/172 |

FOREIGN PATENT DOCUMENTS

| | | | | |
|---|---|---|---|---|
| GB | 2036918 | * | 7/1980 | 405/172 |
| GB | 2095729 | * | 10/1982 | 405/172 |
| JP | 402245591 | * | 10/1990 | 405/172 |

\* cited by examiner

*Primary Examiner*—Heather Shackelford
*Assistant Examiner*—Jong-Suk Lee
(74) *Attorney, Agent, or Firm*—I. Zborovsky

(57) ABSTRACT

A device for anchoring a pipeline has a tubular lower portion formed so as to be screwed into soil and firmly retained in the soil, a tubular extension having a lower end connected with the lower portion and an upper end connectable to a rotary drive, and tether ropes extending inside the tubular lower portion and tubular extension and having lower ends connected with the lower portion and upper ends adapted to be wrapped around a pipeline and firmly connected to the pipeline, so that the pipeline is held by the tether ropes at a desired depth.

5 Claims, 2 Drawing Sheets

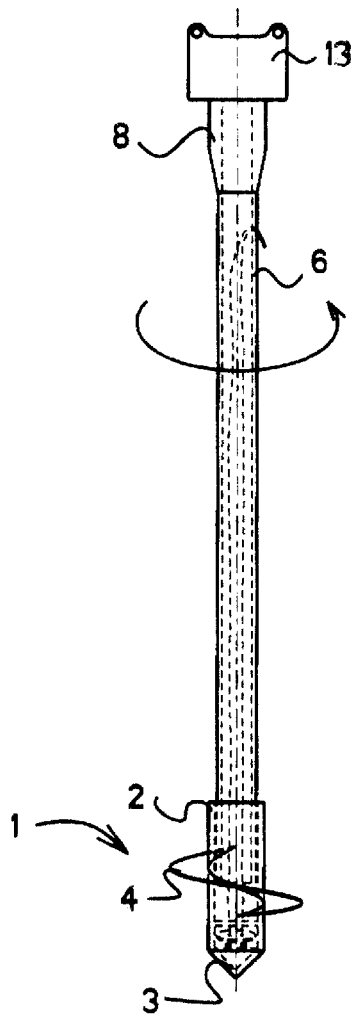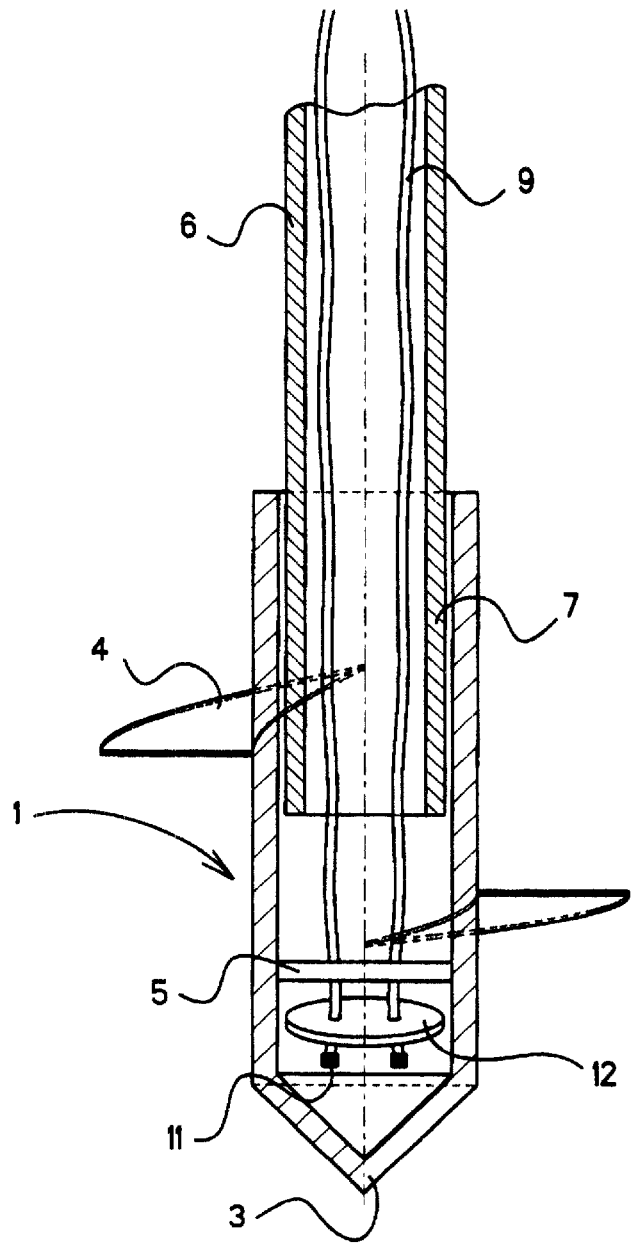
FIG. 1
FIG. 2

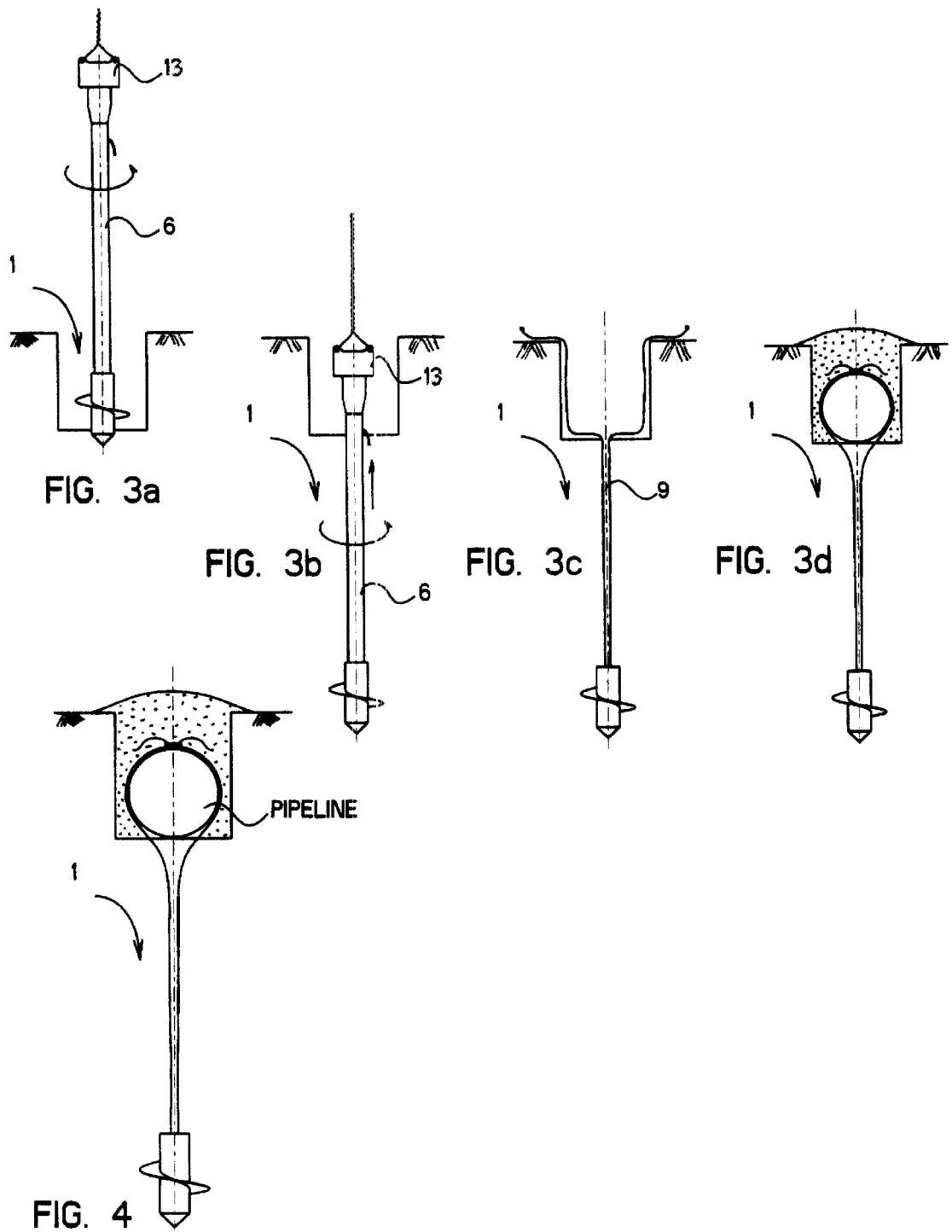

DEVICE FOR ANCHORING A PIPELINE

BACKGROUND OF THE INVENTION

The present invention relates to a device for anchoring a pipeline.

It is a requirement in the pipeline industry that pipelines be installed in a trench at depth below the natural ground surface. Almost all larger pipelines are positively buoyant and will tend to float to the surface if the local ground is saturated with water and the local ground material does not provide sufficient shear strength when returned to the trench. These conditions occur in areas such as swamps, muskeg, permafrost and bogs.

The pipeline industry has adapted several methods to overcome this positive buoyancy condition to ensure that the pipeline remains buried and stable in the ground. The most common method is to fix concrete to the pipeline. This method includes two different approaches. The first approach is to apply a continuous layer of concrete to the pipe in a coating plant and then transport the coated pipe to the ditch side. The pipe is then welded, the ditch dug and the weighted pipe installed in the trench. This method is expensive and requires the designer to know where the weighting in needed prior to ditching, which often leads to installing the weighted pipe in the wrong location.

A second approach is to install specially fabricated concrete weights to the pipeline prior to installing the pipe into the ditch. This approach is expensive and again requires that the locations and quantities be known prior to ditching operations. Not committing to weight location until after ditching will require that the ditch be left open an extended period of time to allow the work of hauling, stringing and mounting the concrete weights onto the pipe. This time delay is undesirable, particularly in winter construction in muskeg due to freezing of the backfil.

An alternate to concrete weights is screw anchors of the type described in U.S. Pat. No. 5,730,552. While this type of anchoring provides some benefits over concrete, it has not replaced concrete due to several problems in the application. Firstly, the screw anchor activity is done with the pipe in the trench. Two anchors are required which straddle the pipe. This method requires an extra wide trench and also requires that laborers work in the trench completing the strap installation raising safety concerns. The chance of accidently contacting the pipe with anchors or anchoring equipment is high. Any damage to the coating or pipe will initiate an expensive repair. This method is not feasible where the underlaying ground material contains cobbles or boulders or where the ditch is partially filled with water. Also, this method could not be used in permafrost areas because heat from the ground surface or pipeline would be transmitted down the

SUMMARY OF THE INVENTION

Accordingly, it is an object of the present invention to provide a device for anchoring a pipeline, which eliminates the disadvantages of the prior art.

More particularly, it is an object of the present invention to provide a device for anchoring a pipeline, which maintains the pipeline in buried conditions even in presence of saturated soil with inadequate shear strength to resist buoyant forces.

It is still a further feature of the present invention to provide a device for anchoring a pipeline which can be installed prior to the pipeline being set into a trench, which does not have metal in the vicinity of the completed pipeline, which will not thaw underlying thermofrost, and which will fit a large variety of pipeline diameters.

In keeping with these objects and with others which will become apparent hereinafter, one feature of the present invention resides, briefly stated, a device for anchoring in a buried pipeline, which has a lower portion adapted to be screwed into soil so as to be anchored in the latter, a hollow extension having a lower end connected with said lower section and an upper end connectable to a rotary drive, and tether ropes which have screw anchor and melt. the permafrost with potentially catastrophic consequence.

What is needed is a simple screw anchor design, which is inexpensive and can be installed quickly prior to the pipe being installed into the trench such that the screw installation does not have to be a precision operation. Also, what is needed is an anchoring system, which will not conduct heat from the ground surface downward into permafrost. lower ends fixed to said lower section and upper ends adapted to be strapped around a pipeline and to be fixedly held on the latter.

When the device is designed in accordance with the present invention, the lower section of the device is screwed into a soil, forms a hole, and is anchored in the soil, with tether ropes extending upwardly from the lower section through the thusly drilled hole, and when the extension is removed, the upper ends of the tether ropes are wrapped around the pipeline and firmly held on it, for example by a clamp, thus continuously maintaining the pipeline at the desired depth.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a device for anchoring a pipeline;

FIG. 2 is a view showing a lower part of the inventive device, on an enlarged scale;

FIGS. 3a–3d are views showing corresponding steps of anchoring a pipeline with: the inventive anchoring device; and FIG. 4 is a view showing a pipeline anchored with the inventive device.

DESCRIPTION OF THE PREFERRED EMBODIMENTS

A device for anchoring the pipeline in accordance with the present invention has a lower portion which is identified as a whole with reference numeral 1. The lower portion 1 is formed so that it can be screwed into a soil and firmly anchored in it. For this purpose the lower portion has a hollow tubular section 2 which terminates in a point 3 at its lower end. A helical member 4 is fixed to the tubular section 2, to provide a screw shape required to achieve a penetration when the lower portion 1 is rotated. The lower portion is further provided with a tether ropes retainer 5 formed as a transverse member provided with a plurality of holes, for example two holes for the tether ropes.

The device further has an extension which is identified with reference numeral 6. The extension can be tubular and has a lower end 7 which is connected with the tubular section 2, for example by a thread, and an upper end 8 connectable to a rotary drive. The extension 6 has a circular or square cross-section.

A device further has tether ropes which are identified with reference numeral 9. At the lower end, the tether ropes 9 have thickened portions 11 and a transverse member 12 provided with holes, so that the tether ropes extend through the holes and [is] therefore held by the thickenings below the transverse member. The transverse member 12 abuts from below against the retaining member 5 of the lower portion 1. Therefore the lower ends of the tether ropes 9 are firmly held in the lower portion 1.

The upper end of the extension 6 is connectable to a rotary drive, formed for example as a drive motor 13. The connection can be formed by screwing of the upper end of the extension on a screwed rotary shaft of the drive motor 13. The device operates in the following manner:

First a ditch is formed for future positioning of a pipeline. The tether ropes 9 are fed through the bottom of the tubular extension 6 and extend through an upper hole at the top of the tubular extension. Then the lower portion 1 is screwed onto the bottom end of the tubular extension 6, with a fixed connection therebetween. The tether ropes 9 are strapped to the tubular extension 6 to avoid entangelement. FIGS. 3a–3d show the steps of the anchoring process. The device is introduced into the ditch in FIG. 3a, and the lower portion 1 is rotated from the drive motor 13 through to the tubular extension 6 as shown in FIG. 3b. The device is rotated downward until the lower section encounters a competent subsoil. Then the tubular extension 6 is disconnected from the lower portion and is raised together with the drive motor. The lower portion 1 is left anchored in the subsoil, and the tether ropes 9 are extended to the surface, as shown in FIG. 3c. Then the pipe is positioned in the trench, and the tether ropes 9 are fixed over the pipe to permanently tether the pipes, as shown in FIG. 3d. A clamp can hold the upper end of the ropes in the fixed position on the pipe. Then the pipeline is backfilled to complete the construction.

It will be understood that each of the elements described above, or two or more together, may also find a useful application in other types of constructions differing from the types described above.

While the invention has been illustrated and described as embodied in device for anchoring a pipeline, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for anchoring a pipeline, comprising a lower portion formed so as to be screwed into soil and firmly retained in the soil; an extension having a lower end connected with said lower portion and an upper end connectable to a rotary drive; and tether ropes having lower ends connected with said lower portion and upper ends adapted to be wrapped around a pipeline and firmly connected to the pipeline, so that the pipeline is held by said tether ropes at a desired depth, said lower portion including a tubular section having a lower end narrowing to a point and a screw member arranged on an outer surface of said tubular section, said lower ends of said tether ropes extending into an interior of said tubular section.

2. A device as defined in claim 1, wherein said extension is formed as a tubular extension, said tether ropes extending through an exterior of said tubular extension.

3. A device as defined in claim 1; and further comprising retaining means arranged in the interior of said tubular section of said lower portion and holding said lower ends of said tether ropes.

4. A device as defined in claim 3, wherein said retaining means includes a retaining member connected to said tubular section and provided with holes through which said lower ends of said tether ropes are passed.

5. A device for anchoring a pipeline, comprising a tubular lower portion formed so as to be screwed into soil and firmly retained in the soil; a tubular extension having a lower end connected with said lower portion and an upper end connectable to a rotary drive, and removable from said lower portion; tether ropes extending inside said tubular extension and inside said lower portion, said tether ropes having lower ends connected with said lower portion and upper ends adapted to be wrapped around a pipeline and firmly connected to the pipeline; and means for releasably connecting said lower end of said extension with said lower portion, so that during screwing said tubular lower portion into the soil together with said tubular extension said tether ropes always remain inside said tubular extension and said tubular lower portion and thereafter when said tubular extension is removed from said tubular lower portion, said lower ends of said tether ropes remain connected with said lower portion while said upper ends of said tether ropes are firmly connected to the pipeline, whereby the pipeline is firmly connected to said tubular lower portion retained in the soil.

* * * * *